United States Patent [19]
Torres

[11] 4,030,392
[45] June 21, 1977

[54] CAN SLITTING DEVICE

[76] Inventor: Lorenzo Torres, 15910 Hill St., LaPuente, Calif. 91744

[22] Filed: Jan. 29, 1976

[21] Appl. No.: 653,434

[52] U.S. Cl. .................................. 83/178; 83/54; 83/466.1; 83/607

[51] Int. Cl.² ...................................... B23D 17/08

[58] Field of Search ............. 83/54, 195, 187, 178, 83/924, 607, 608, 609, 907, 648, 466.1; 30/92.5

[56] References Cited

UNITED STATES PATENTS

| | | | |
|---|---|---|---|
| 464,307 | 12/1891 | Robisehung | 83/195 |
| 877,855 | 1/1908 | Murray | 83/195 X |
| 1,054,143 | 2/1913 | Plost | 83/178 X |
| 1,270,175 | 6/1918 | Lambe | 83/178 |
| 1,600,632 | 9/1926 | Hartsoe | 83/178 |
| 2,696,254 | 12/1954 | Mugavero | 83/187 X |
| 2,957,065 | 10/1960 | Bundegaard et al. | 83/171 X |
| 3,134,285 | 5/1964 | Green | 83/607 X |
| 3,180,194 | 4/1965 | Locke | 83/607 X |
| 3,279,295 | 10/1966 | Teplitz | 83/607 X |
| 3,288,010 | 11/1966 | Rutz | 83/195 X |

*Primary Examiner* — Frank T. Yost
*Attorney, Agent, or Firm* — Boniard I. Brown

[57] ABSTRACT

A can slitting device is provided for cutting slits in cans, such as beverage cans, typically for producing ornamental objects. The device comprises a lever pivotally mounted on a vertical member and carrying a blade to cut the can upon urging the lever, and a cylindrical support extending from the support and adapted to extend into a can, the blade being received in the slit as the can is cut.

4 Claims, 4 Drawing Figures

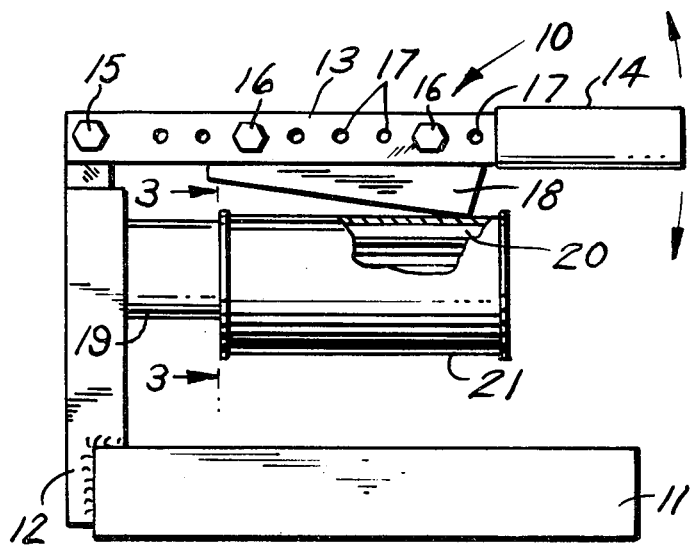
FIG.1
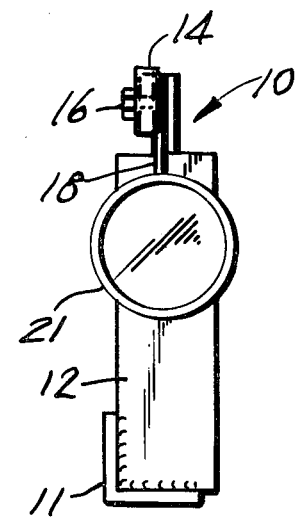
FIG.2
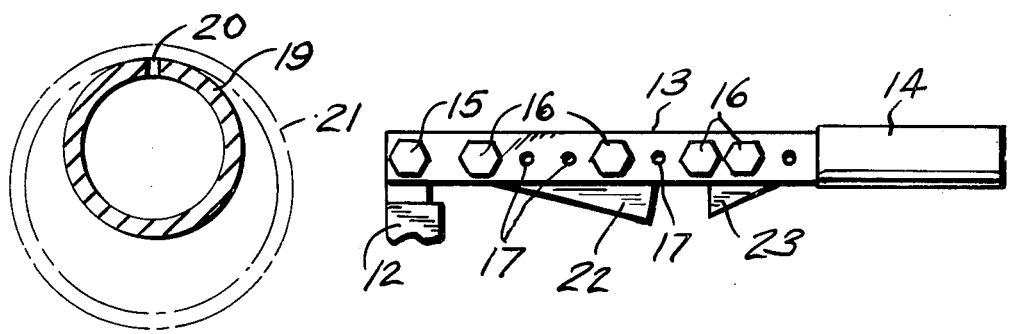
FIG.3
FIG.4

CAN SLITTING DEVICE

The present invention relates to cutting devices, and more particularly to a can slitting device or cutter.

It is therefore the principal object of this invention to provide a can slitting machine cutter which may be hand or foot pedal operated so as to slice into a metal can in order to produce strips of various widths.

Another object of this invention is to provide a device of the type described, which will have a cylinder with a longitudinal slot for receiving the blade, and the cylinder provides support means for the can that is to be made into strips.

A further object of this invention is to provide a device of the type described, which will have removable blade means carried within the lever portion, the blades being of any desired size, the device being used to form strips for producing various ornamental objects.

Other objects of the invention are to provide a cutting device which is simple in design, inexpensive to manufacture, rugged in construction, easy to use and efficient in operation.

BRIEF DESCRIPTION OF THE DRAWINGS

FIG. 1 is a side view of the present invention shown in elevation with a can shown partly broken away;

FIG. 2 is an end view of FIG. 1;

FIG. 3 is a cross-sectional view taken along the line 3—3 of FIG. 1, showing the can in phantom outline;

FIG. 4 is a fragmentary side view showing a modified blade arrangement which will leave a space uncut in the can surface.

BRIEF DESCRIPTION OF THE PREFERRED EMBODIMENT

According to this invention, a can slitting machine cutter 10 is shown to include a base 11 member of L-shaped cross-sectional configuration which is welded to a similar shaped vertical member 12. A lever 13 provided with a handle grip 14 is pivotably secured to the vertical member 12 by means of a bolt fastener 15. A pair of bolt fasteners 16 are receivable within any of a plurality of spaced apart openings 17 of lever 13 so as to secure a cutting blade 18 to lever 13. A cylinder 19 is fixedly secured to vertical member 12 in a suitable manner and is parallel with the base 11, the cylinder 19 having a slot 20 for freely receiving the blade 18 when slicing into the can 21.

Referring now to FIG. 4 of the drawing, a modified blade arrangement is shown to include a pair of blades 22 and 23 which are secured by bolt fastener means 16 to lever 13. The arrangement of FIG. 4 provides a means of cutting slits in the can 21 while leaving a section in between the cuts that is uncut.

In use, the can 21 is placed as shown in FIG. 1, upon the cylinder 19 and the lever is pivoted downwards thus causing the blade 18 to slice into the can while simultaneously passing into the slot 20 of the cylinder 19.

It shall be noted that the can 21 must be opened at one end so as to enable it to be received upon the cylinder 19.

It shall further be noted that device 10 is portable and may or may not be clamped to a table or bench and the device is adaptable for being used in plural, side by side, with a frame attached to the levers 13, the arrangement being such that more than one can 21 may be cut simultaneously and the device is also adaptable for use with a foot pedal.

It shall still further be noted that the blades 18 are interchangeable within lever 13 and a blade may be used that is of such length, so that it will run the entire length of the can 21, and a solid cylinder 19 may be replaceable with the hollow cylinder 19 shown in FIGS. 1, 2 and 3.

The inventor claims:

1. A can slitting apparatus comprising:
   a vertical member supported on base means,
   cylindrical support means extending from the vertical member and configurated to extend into and support a can,
   a lever pivotally mounted on the vertical member, and
   blade means on the lever to cut the can upon urging of the lever toward the cylindrical means,
   said cylindrical support having at least one narrow axially extending peripheral slot adapted to receive said blade means as the can is cut thereby.

2. A can slitting apparatus according to claim 1, wherein:
   the outer peripheral surface of the cylindrical support abuts an inner peripheral surface of the can, said slot is generally axial of the can, and said lever is positioned to engage the can surface at such an angle that the blade cuts the can in a shearing action as the blade is received in said slot.

3. A can slitting apparatus according to claim 2, wherein:
   the blade has an inclined edge to facilitate said shearing cutting action.

4. A can slitting apparatus according to claim 2, wherein:
   said blade is removably secured on the lever, and said lever has openings for receiving fasteners for such removable securement.

* * * * *